United States Patent
Park et al.

(10) Patent No.: US 8,624,796 B2
(45) Date of Patent: Jan. 7, 2014

(54) APPARATUS AND METHOD FOR CONTROLLING DUAL DISPLAY USING RGB INTERFACE IN MOBILE TERMINAL WITH PROJECTOR MODULE

(75) Inventors: Byeong-Hoon Park, Suwon-si (KR); Sung-Soon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 397 days.

(21) Appl. No.: 12/832,543

(22) Filed: Jul. 8, 2010

(65) Prior Publication Data

US 2011/0007084 A1 Jan. 13, 2011

(30) Foreign Application Priority Data

Jul. 13, 2009 (KR) .................. 10-2009-0063499

(51) Int. Cl.
*G09G 5/00* (2006.01)
*G09G 5/36* (2006.01)

(52) U.S. Cl.
USPC ........................................... 345/1.1; 345/545

(58) Field of Classification Search
USPC .................................................. 345/1.1, 545
See application file for complete search history.

(56) References Cited

U.S. PATENT DOCUMENTS

| 7,573,438 | B2 * | 8/2009 | Nohara ........................... 345/1.1 |
| 7,883,221 | B2 * | 2/2011 | Nozaki et al. ................. 353/122 |
| 2003/0011534 | A1 * | 1/2003 | Rengan et al. ................. 345/1.1 |
| 2008/0030425 | A1 * | 2/2008 | Fullerton et al. .............. 345/1.1 |

* cited by examiner

*Primary Examiner* — Jacinta M Crawford
(74) *Attorney, Agent, or Firm* — The Farrell Law Firm, P.C.

(57) ABSTRACT

A method and apparatus is provided for controlling a dual display using a Red, Green and Blue (RGB) interface in a mobile terminal with a projector module, in which the projector module expends a high-resolution image and projects the expended image to the outside, a display displays a menu image for operation of the projector module, an image processor has a first buffer assigned to the display for data transmission to the display, and a second buffer assigned to the projector module for data transmission to the projector module, and a controller transmits image data to the first and second buffers, and outputs control signals for activating both or a selected one of the first and second buffers, depending on selection of a display mode.

12 Claims, 4 Drawing Sheets

APPARATUS AND METHOD FOR CONTROLLING DUAL DISPLAY USING RGB INTERFACE IN MOBILE TERMINAL WITH PROJECTOR MODULE

PRIORITY

This application claims priority to an application filed with the Korean Intellectual Property Office on Jul. 13, 2009 and assigned Serial No. 10-2009-0063499, the contents of which are incorporated herein by reference.

BACKGROUND OF THE INVENTION

1. Field of the Invention

The present invention relates generally to an apparatus and method for controlling a dual display, and more particularly, to an apparatus and method for controlling a dual display in a mobile terminal with a projector module.

2. Description of the Related Art

In order to overcome the limitation of screen size of mobile terminals, a function capable of displaying information of the mobile terminals on large external display devices has been recently developed, such as the TV-OUT function, and the use of a connector connecting mobile terminals to the external projector devices has increased accordingly.

In addition to the above functions, a technology also has been developed that mounts a small projector module in mobile terminals instead of using the external projector devices. A mobile terminal with the projector module allows a user to view Digital Multimedia Broadcasting (DMB) images on large screens by projecting the DMB images onto any alternative screens such as A4 papers, walls and white shirts, mitigating the inconvenience of viewing the images on a small Liquid Crystal Display (LCD) screen.

When the mobile terminal includes a projector module, a user may input commands such as numbers and characters, by directly pressing buttons on a keypad of the mobile terminal in order to control the projector module. Recently, however, touch pad technology has been increasingly applied to most mobile terminals, and full-touch phones are becoming the trend of the next-generation mobile terminals. In this case, the user touches soft buttons displayed on the screen rather than pressing hard buttons on the existing keypad, and then the mobile terminal recognizes numbers, characters and commands corresponding to the touch inputs.

A full-touch LCD screen of the mobile terminal with a projector module should always be turned on in order to receive key inputs. In the conventional mobile terminal with a projector function shown in FIG. 1, for example, when a user desires to watch a DMB broadcast, an image 110 for the DMB broadcast may be projected onto a projector screen 100, and volume information, channel change information and other control command buttons may be displayed on an LCD screen 120 of the mobile terminal.

In this case, there is a need to focus on controlling the data to be output through the LCD screen 120 and the data to be output through the projector screen 100. With the development of multimedia, when large high-resolution images are processed, efficient data processing should also be considered. In images with a resolution of Wide Video Graphics Array (WVGA) (800×480 or 854×480 class), the existing Central Processing Unit (CPU) interface needs a Write Enable (WE) signal of about up to 43 nsec to transmit video data consisting of 30 frames per second to an LCD panel and a projector module. That is, if the resolution increases, the time required to display one frame should be reduced. In particular, an expensive Application Processor (AP) chip for fast signal processing is needed to avoid high power consumption.

SUMMARY OF THE INVENTION

An aspect of the present invention is to address at least the above-mentioned problems and/or disadvantages and to provide at least the advantages described below. Accordingly, an aspect of the present invention provides a control apparatus and method for outputting high-resolution images through an LCD panel and a projector module of a mobile terminal.

Another aspect of the present invention provides an apparatus and method for controlling a dual display in a mobile terminal with a projector module, in which a projector function can be implemented at a low cost by using the existing LCD panel and AP chip, and the projector module.

In accordance with an aspect of the present invention, there is provided an apparatus for controlling a dual display using a Red Green and Blue (RGB) interface in a mobile terminal with a projector module, in which the projector module expends a high-resolution image and projects the expended image to the outside, a display displays a menu image for operation of the projector module, an image processor has a first buffer assigned to the display for data transmission to the display and a second buffer assigned to the projector module for data transmission to the projector module, and a controller transmits image data to the first and second buffers, and outputs control signals for activating both or a selected one of the first and second buffers, depending on selection of a display mode.

In accordance with another aspect of the present invention, there is provided a method for controlling a dual display using an RGB interface in a mobile terminal having a display and a projector module, in which a display mode is determined when the projector module is in an ON state, control signals are output according to the display mode, to activate both or a selected one of a first buffer assigned to the display for data transmission to the display and a second buffer assigned to the projector module for data transmission to the projector module, and image data from the first and second buffers is output through the display and the projector module respectively, according to the control signals.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE INVENTION

Figure 1:
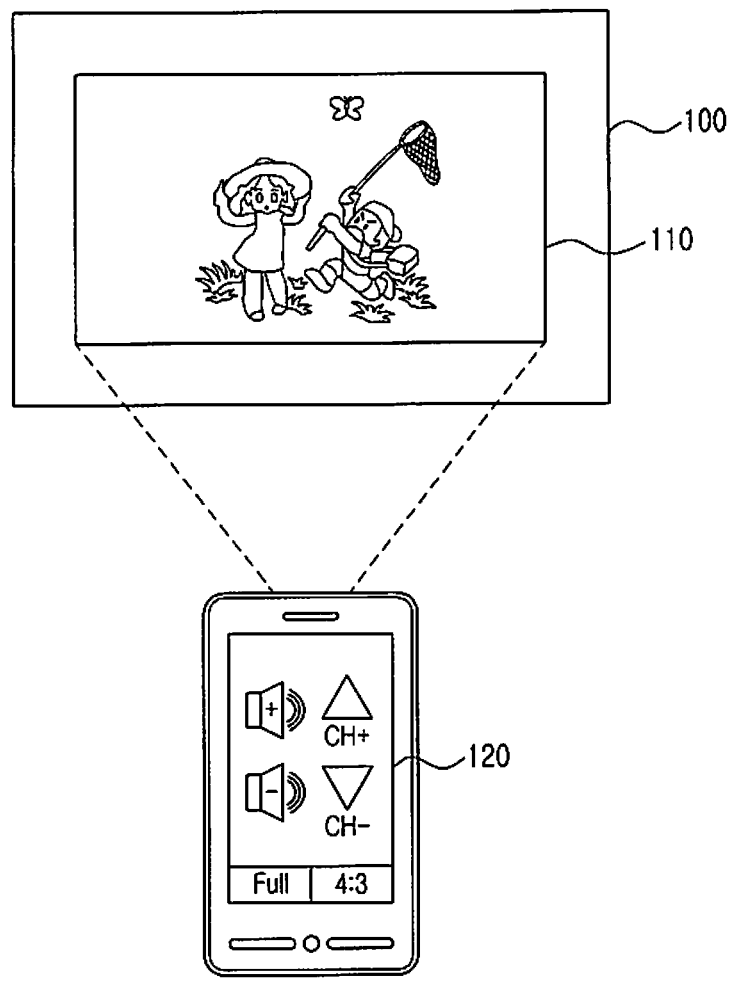
FIG. 1 illustrates an operation of a conventional mobile terminal with a projector function.

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

The present invention provides a method for controlling a dual display in a mobile terminal with a projector module. In particular, the present invention may control each of a mobile terminal's screen and a projector screen in real time by using an RGB interface to support high-resolution images. To be specific, the present invention independently controls data transmitted to each of an LCD panel and a projector driver (or a projector module) of the mobile terminal, and uses Chip Select (CS) signals for this control. By doing so, same or different high-resolution images may be displayed on a mobile terminal's screen and a projector screen.

Prior to a description of the present invention, a brief description of the RGB interface used in the present invention will now be given.

Generally, a CPU interface and/or an RGB interface are used to display images on an LCD panel of a mobile terminal, and control signals and data are transmitted through such interfaces. The CPU interface is mainly used to display still images. The RGB interface may implement high-resolution videos because it scatters data in sync with an external clock. Thus, the RGB interface is suitable to display high-resolution images compared with the CPU interface. With the continuing development of multimedia, however, a method for displaying high-resolution images should be provided in mobile terminals to support the multimedia.

If a modem chip or AP chip supporting the actual resolution of QVGA (240×320) or WQVGA (240×400) is provided in a mobile terminal, the CPU interface is also available. However, if the CPU interface is used when the performance has been improved to the resolution of WVGA (800×480 or 854× 480 class), there is needed a modem chip and an AP chip, which have a high-performance CPU, and the existing display panels cannot be used. Considering this, the present invention uses the RGB interface that can easily display high-resolution images compared with the CPU interface.

A description will now be made of a structure of a control apparatus for displaying high-resolution images through an LCD panel and a projector driver in a mobile terminal that supports a projector function using an RGB interface.

A first embodiment of the present invention controls images being transmitted to an LCD panel and a projector driver through their associated paths using CS signals. A second embodiment of the present invention controls data being transmitted to an LCD panel only when the LCD panel needs an image update while the projector function is in operation.

Figure 2:
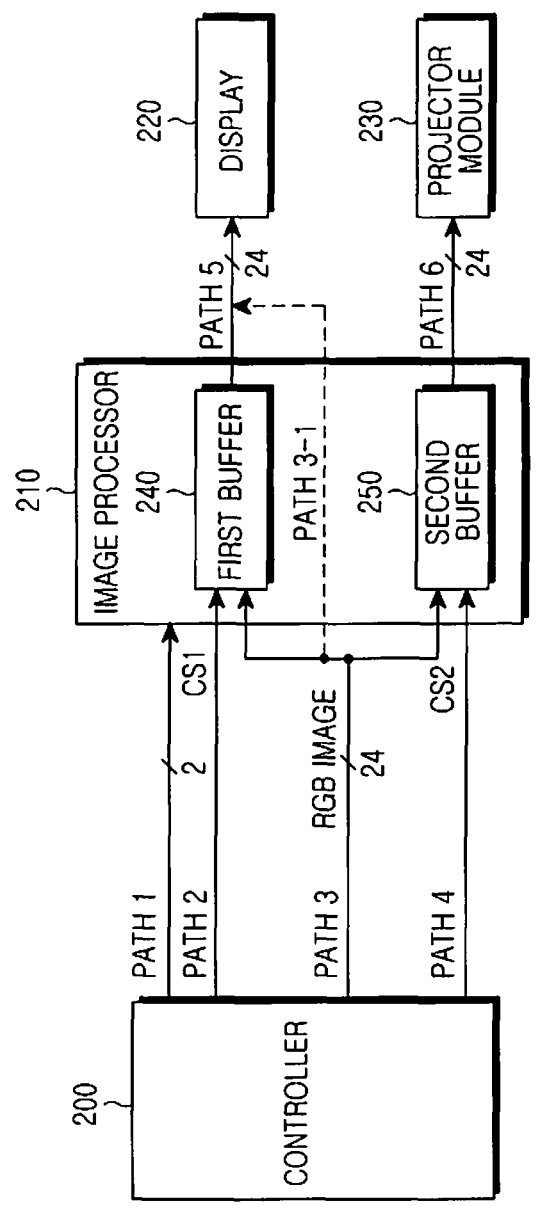
FIG. 2 illustrates an internal structure of a mobile terminal with a projector function according to a first embodiment of the present invention.

FIG. 2 illustrates an internal structure of a mobile terminal with a projector function according to the first embodiment of the present invention.

A dual-display control apparatus according to the first embodiment of the present invention essentially includes a controller 200, an image processor 210, a display 220, and a projector module 230. While only the blocks needed for a description of the first embodiment of the present invention are shown in FIG. 2 for convenience, the present invention will not be limited to these blocks. Herein, the controller 200 may be realized using an application processor, and the image processor 210 may be implemented using an image control Integrated Circuit (IC).

The controller 200 serves to control the overall operation of the mobile terminal and a signal flow between the components. The controller 200 outputs control signals to the image processor 210 so that images may be displayed according to each of standards of the display 220 and the projector module 230.

Four paths are formed for outputting the control signals and for data transmission. A path #1 may be realized with 2 pins, and serves as a path for transmitting screen change information. Initial setting values such as an individual porch value and a resolution are transmitted through path #1. The term "porch value" as used herein refers to top, bottom, left and right margins of images displayed through the display 220 and the projector module 230. A path #3 may be realized with 24 pins, and serves as a path through which image data is transmitted. A path #2 and a path #4 are connected, respectively, to a first buffer 240 for storing data to be transmitted to the display 220 and a second buffer 250 for storing data to be transmitted to the projector module 230. As control signals are transmitted from the controller 200 through the paths #2 and #4 and chip select signals CS1 and CS2 are both enabled through the paths #2 and #4, data from the first and second buffers 240 and 250 may be simultaneously transmitted to the display 220 and the projector module 230 through paths #5 and #6, respectively. By doing so, it is possible to output synchronized same images.

When the projector module 230 is in an OFF state, the first buffer 240 may not be used because it is not necessary to acquire synchronization with the projector module 230. Thus, in this bypass mode, images are directly transmitted to the display 220 through a path #3-1.

However, when it is desired to display different images, the controller 200 alternately enables the chip select signals CS1 and CS2 through the paths #2 and #4 in a toggle manner. First, the controller 200 activates the first buffer 240 assigned to the display 220 by enabling the chip select signal CS1 through path #2, and then instructs the display 220 to load data for a menu image from the first buffer 240. Subsequently, the controller 200 disables the chip select signal CS1 through the path #2 and then enables the chip select signal CS2 through the path #4 so that data from the second buffer 250 may be transmitted to the projector module 230. Thereafter, upon occurrence of an even in which a menu configuration of the display 220 should be changed, the controller 200 changes data displayed on the display 220 by disabling the chip select signal CS2 through the path #4 and enabling the chip select signal CS1 through the path #2 during one frame. By doing so, a menu image for operation of the projector module 230 is displayed on the display 220, and videos may be projected onto the projector screen.

The image processor 210 serves to control data being transmitted to the display 220 and the projector module 230 under the control of the controller 200, and for this control, includes two frame buffers 240 and 250. By providing the first and second buffers 240 and 250, it is possible to transmit different or same data to the display 220 and the projector module 230, enabling independent control. This image processor 210 may feed back data from the controller 200 by the chip select signals through paths #2 and #4. In case the image signals supported in the display 220 and the projector module 230 are incompatible with each other, the image processor 210 is adapted to enable independent settings, including self-generating RGB image signals supported in each of the display 220 and the projector module 230, such as a back porch, a front porch and a sync signal.

The display 220 may be realized with an LCD panel, and if the LCD panel is realized in the form of a touch screen, the display 220 may also serve as an input means. The display 220 serves to display user input information or information provided to the user, including various menus of the mobile terminal. Particularly, the display 220 displays menus for operation of the projector module 230, and may also display the same image as the image displayed through the projector module 230. When displaying the same images, the display 220 may display the images without any loss in performance of the controller 200.

The projector module 230 is provided in the mobile terminal and serves to expand images and project them onto external screens.

Figure 3:
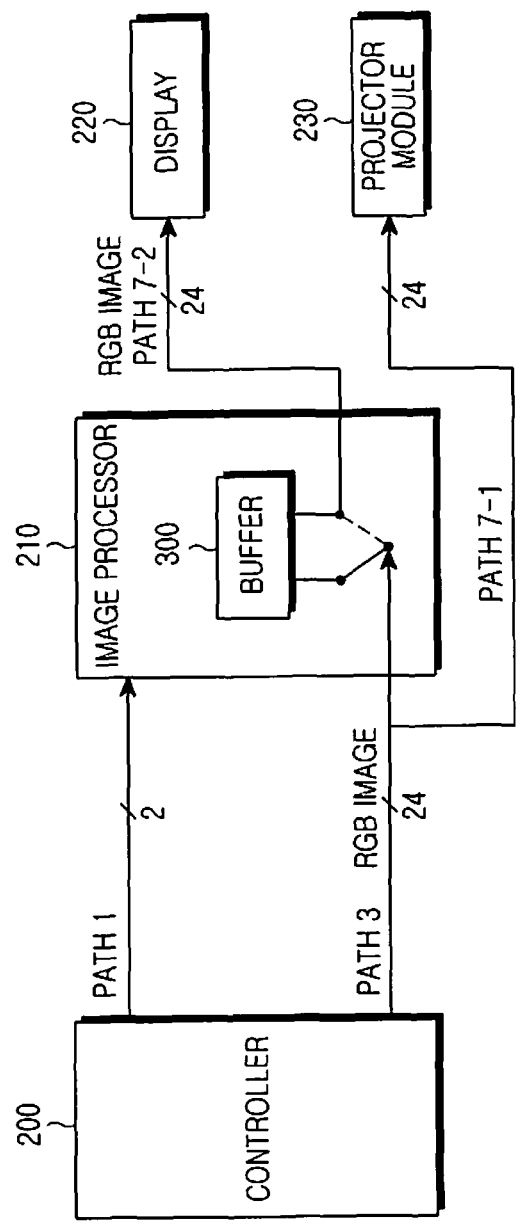
FIG. 3 illustrates an internal structure of a mobile terminal with a projector function according to a second embodiment of the present invention.

With reference to FIG. 3, a description will be made of the second embodiment of the present invention, in which data being transmitted to an LCD panel is controlled only when an image on the LCD panel needs to be updated while a projector function is in operation.

Referring to FIG. 3, unlike in the first embodiment of the present invention, the image processor 210 includes only one buffer 300 and uses no chip select signal, so only two paths exist between the controller 200 and the image processor 210. A set value for controlling a menu image displayed on the display 220 and an update command, are transmitted through path #1. Image data is transmitted through path #3, and may be transmitted to the display 220 through the buffer 300, or may be directly transmitted to the display 220 without passing through the buffer 300 in a bypass mode. At the same time, the image data may be transmitted even to the projector module 230 through path #7-1. This method excludes chip select signals, and reduces the number of output pints in the image processor 210.

In this method, if the projector module 230 is in an OFF state, image data is directly transmitted to the display 220 through a path #7-2 without passing through the buffer 300 in a bypass mode. That is, the display 220 is directly connected to the controller 200, and displays data from the controller 200.

However, if the projector module 230 is in an ON state, the controller 200 transmits an update command to the image processor 210 to control it only when information displayed on the display 220 is updated. An I2C command may be used as the update command. Specifically, the update command is transmitted to the image processor 210 through the path #1. Thus, the final image being projected or the image being updated is stored in the buffer 300 of the image processor 210, and the buffer 300 generates an image signal to the display 220, which has predetermined porch values. When the image needs to be updated, the image processor 210 may fetch data from the controller 200 by controlling path #1.

According to the second embodiment of the present invention, since data of the controller 200 can be directly transmitted to the projector module 230, the image processor 210 can minimize the number of its output pins, contributing to a reduction in chip size and ensuring price competitiveness. Path #7-1 may be connected to the buffer 300 instead of being connected in front of the image processor 210, in which case the image processor 210 may directly generate output signals to the display 220 and the projector module 230 on behalf of the controller 200, which removes the need to consider pan-out and load capacity of the controller 200.

While it has been described in the first and second embodiments of the present invention that the image processor 210 is interposed between the controller 200 and the display 200 and the projector module 230, the image processor 210 may also be integrated in controller 200. That is, the image processor 210 may be built in the controller 200.

Figure 4:
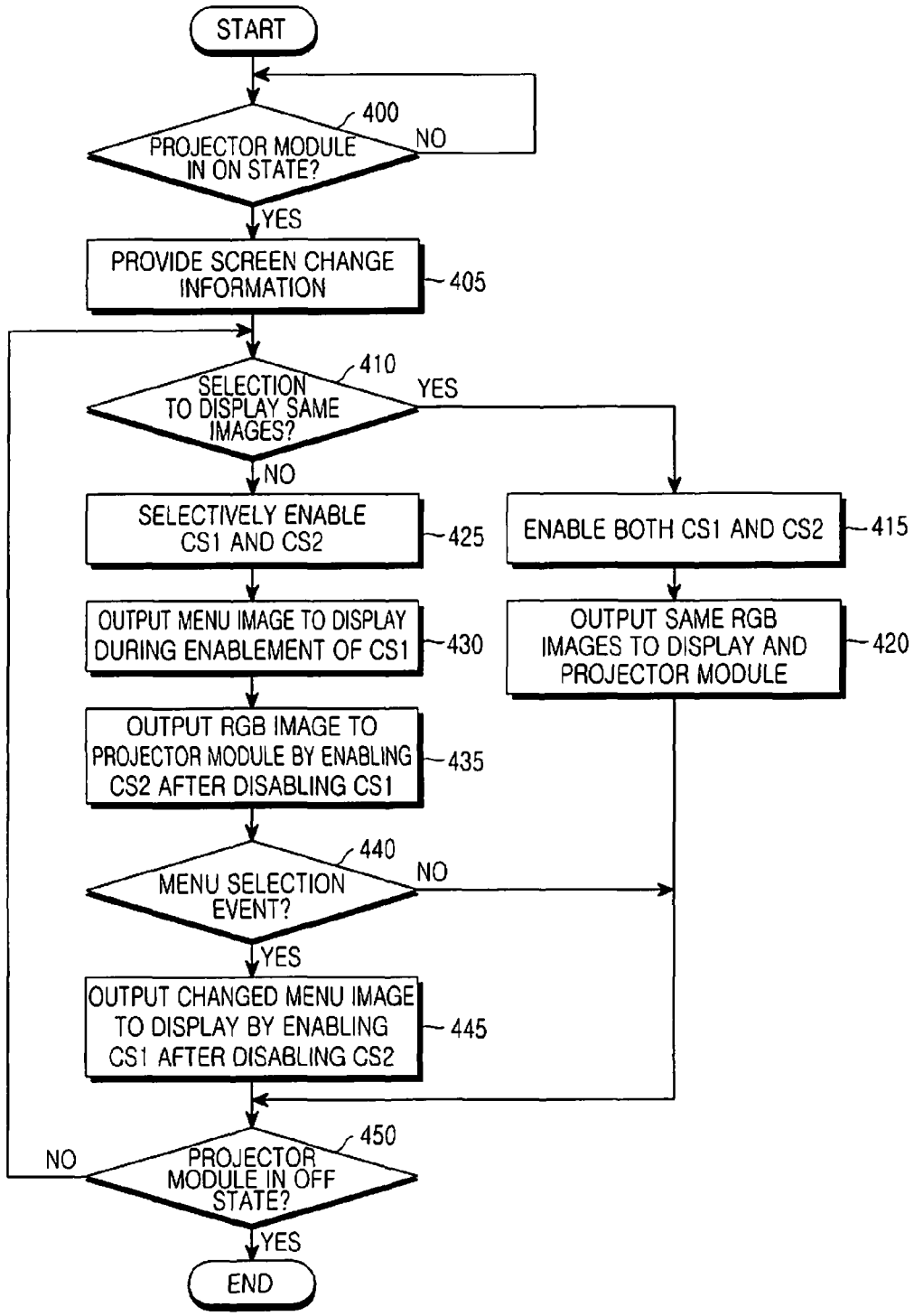
FIG. 4 illustrates an operation of a mobile terminal with a projector function according to the first embodiment of the present invention.

An operation according to the first embodiment of the present invention will now be described with reference to FIG. 4. Referring to FIG. 4, if the projector module 230 is in an ON state in step 400, the controller 200 provides screen change information to the image processor 210 through path #1 in step 405. Thereafter, the controller 200 determines in step 410 whether there is a selection to display the same images on the display 220 and the projector module 230. If so, the controller 200 enables both of the chip select signals CS1 and CS2 in step 415, and data from the first and second buffers 240 and 250 is transmitted to the display 220 and the projector module 230, respectively, based on the enable signals in step 420. In this case, the same RGB images are output to the display 220 and the projector module 230.

In contrast, if there is no selection to display the same images, i.e., if there is a selection to display different images, the controller 200 selectively enables the chip select signals CS1 and CS2 in step 425. In step 430, the controller 200 outputs a menu image to the display 220 while the chip select signal CS1 is enabled. In step 435, the controller 200 enables the chip select signal CS2 after disabling the chip select signal CS1, and outputs an RGB image to the projector module 230. By doing so, the controller 200 outputs different images through the display 220 and the projector module 230.

If a menu selection event is input from a user through the display 220 in step 440, the controller 200 enables the chip select signal CS1 after disabling the chip select signal CS2 to output a changed menu image transmitted from the controller 200 to the display 220 in step 445. Thus, a changed menu image is displayed on the display 220. Thereafter, unless the projector module 230 is in an OFF state in step 450, the controller 200 returns step 410 and repeats the proceeding steps, and if the projector module 230 is in the OFF state, the image processor 210 operates in a bypass mode in which the display 220 is directly connected to the controller 200. Thus, the display 220 directly receives data from the controller 200 and displays the received data.

As is apparent from the foregoing description, according to an embodiment of the present invention, the mobile terminal may output high-resolution images through the LCD panel and the projector module even though it uses the RGB interface. In addition, the projector function may incur a low cost by using the existing LCD panel and AP chip and the projector module.

According to another embodiment of the present invention, the mobile terminal not only may display different images on the projector screen and the mobile terminal's screen, but also may output the same images during web browsing, despite using the RGB interface. According to the present invention, it is also possible to remove input pointing errors that may occur during web browsing. Moreover, even though an image control IC is added, compatibility with the existing LCD panel and AP chip is maintained, so they can be used without specification changes. Accordingly, it is not necessary to use high-performance AP chips, contributing to a reduction in the total cost of the system, and the existing intact platform can be used, shortening the development period.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An apparatus for controlling a dual display using a Red, Green and Blue (RGB) interface in a mobile terminal with a projector module, comprising:
the projector module for expending a high-resolution image and projecting the expended image outside the projector module;
a display for displaying a menu image for operation of the projector module;
an image processor having a first buffer assigned to the display for data transmission to the display, and a second buffer assigned to the projector module for data transmission to the projector module; and
a controller for transmitting image data to the first and second buffers, and outputting control signals for activating both or a selected one of the first and second buffers, depending on selection of a display mode,
wherein the controller provides screen setting information for each of the display and the projector module to the image processor, and
wherein the setting information includes at least one of a porch value and a resolution for images displayed through the display and the projector module.

2. The apparatus of claim 1, wherein the display mode includes a first mode in which same images are output through the display and the projector module, and a second mode in which different images are output through the display and the projector module.

3. The apparatus of claim 2, wherein when the first mode is selected, the controller simultaneously outputs first and second control signals for activating the first and second buffers so that the same image data is transmitted to the first and second buffers.

4. The apparatus of claim 2, wherein when the second mode is selected, the controller transmits data for the menu image to the first buffer after outputting a first control signal for activating the first buffer, and transmits high-resolution image data to the second buffer by outputting a second control signal for activating the second buffer after stopping output of the first control signal.

5. The apparatus of claim 4, wherein upon an update request for the menu image, the controller transmits data of a menu image to be updated to the first buffer by outputting the first control signal.

6. The apparatus of claim 1, wherein when the projector module is in an OFF state, the image processor operates in a bypass mode in which image data from the controller is directly transmitted to the display.

7. A method for controlling a dual display using a Red, Green and Blue (RGB) interface in a mobile terminal with a display and a projector module, comprising:
determining a display mode when the projector module is in an ON state;
setting screen setting information for each of the display and the projector module, wherein the setting information includes at least one of a porch value and a resolution for images displayed through the display and the projector module;
outputting control signals according to the display mode, to activate both or a selected one of a first buffer assigned to the display for data transmission to the display and a second buffer assigned to the projector module for data transmission to the projector module; and
outputting image data from the first and second buffers through the display and the projector module respectively, according to the control signals.

8. The method of claim 7, wherein the display mode includes a first mode in which same images are output through the display and the projector module, and a second mode in which different images are output through the display and the projector module.

9. The method of claim 8, wherein the outputting control signals comprises simultaneously outputting, if the first mode is selected, first and second control signals for activating the first and second buffers so that the same image data is transmitted to the first and second buffers.

10. The method of claim 8, wherein the outputting control signals comprises:
if the second mode is selected, transmitting data for a menu image to the first buffer after outputting a first control signal for activating the first buffer; and
transmitting high-resolution image data to the second buffer by outputting a second control signal for activating the second buffer after stopping output of the first control signal.

11. The method of claim 10, further comprising transmitting data of a menu image to be updated to the first buffer by outputting the first control signal, upon receiving an update request for the menu image.

12. The method of claim 7, further comprising transmitting the image data directly to the display without passing the image data through the first buffer if the projector module is an OFF state.

* * * * *